(12) United States Patent
Chen

(10) Patent No.: US 6,257,124 B1
(45) Date of Patent: Jul. 10, 2001

(54) PRESSURE VESSEL

(76) Inventor: Chin-Tsai Chen, No. 9, Lane 471, Chung-Shan S. Rd., Yung-Kang City, Tainen Hsien, Taiwan, R.O.C. (TW)

(*) Notice: Subject to any disclaimer, the term of this patent is extended or adjusted under 35 U.S.C. 154(b) by 0 days.

(21) Appl. No.: 09/706,851

(22) Filed: Nov. 7, 2000

(30) Foreign Application Priority Data

May 22, 2000 (TW) ................................................ 089208622

(51) Int. Cl.⁷ .............................. A23L 1/00; A47J 27/00; A47J 27/08; A47J 27/09; B65D 45/00
(52) U.S. Cl. .............................. 99/337; 99/403; 220/314; 220/316; 220/325; 220/912
(58) Field of Search ........................ 99/325–333, 337, 99/338, 403–410, 444–450, 483; 126/369, 377.1, 378.1, 373.1, 374.1, 388.1, 389.1, 39 G, 39 R; 220/314, 316, 325, 293, 393, 592, 912, 246, 486, 489; 292/256.67, 256.69; 426/510, 511, 523

(56) References Cited

U.S. PATENT DOCUMENTS

| | | | |
|---|---|---|---|
| 2,549,387 | * 4/1951 | Richeson | 220/316 |
| 4,024,982 | * 5/1977 | Schultz | 220/293 |
| 4,135,640 | * 1/1979 | MacQuilkin et al. | 220/316 |
| 4,161,260 | * 7/1979 | Lagostina | 220/319 |
| 4,162,741 | * 7/1979 | Walker et al. | 220/203 |
| 4,574,988 | * 3/1986 | Karliner | 220/316 |
| 4,711,366 | * 12/1987 | Chen | 99/337 |
| 4,733,795 | * 3/1988 | Boehm | 220/316 |
| 4,796,776 | * 1/1989 | Dalquist et al. | 220/203 |
| 4,932,550 | * 6/1990 | Moucha | 99/403 |
| 5,048,400 | * 9/1991 | Ueda et al. | 99/403 |
| 5,370,257 | * 12/1994 | Chameroy et al. | 220/293 X |
| 5,678,721 | * 10/1997 | Cartigny et al. | 99/337 X |

* cited by examiner

Primary Examiner—Timothy F. Simone
(74) Attorney, Agent, or Firm—Rosenberg, Klein & Lee

(57) ABSTRACT

A pressure vessel having a container, a cover and a control device for closing and opening of the cover of the container, wherein the control device consists of at least two driving arms movably mounted on the cover. A knob is pivotally mounted on a central axis of the cover, and a rotary plate is co-axially fixed at a lower end of the knob. The rotary plate is rotatably movable together with the knob and particularly formed with at least two rotary drivers corresponding to engagement posts formed on driving arms. Jaws fixed at outer ends of the driving arms driven by the rotary drivers of the rotary plate are movable in a radial direction relative to the central axis of the cover between a locking position in which the cover is locked to the container and an unlocking position in which the cover can be removed from the container.

6 Claims, 9 Drawing Sheets

PRESSURE VESSEL

BACKGROUND OF THE INVENTION

1. Field of the Invention

The present invention relates to a pressure vessel having a control device for opening and closing of locking jaws mounted on a cover of the pressure vessel.

2. Description of Related Art

As shown in FIG. 7, a pressure cooking vessel as disclosed in published International Application 92/03090 comprises a cover (40), two jaws (41), a control button (42) and a container (43). Wherein the jaws (41) are diametrically opposite one another relative to the longitudinal axis of the vessel, and mounted on the cover (40) for radial movement displaced via the control button (42) which is mounted in the center of the cover (40) to move axially. The control button (42) has an engagement portion (421) which is formed at a lower end of the control button (42) and specially shaped to act on inclined surfaces (411) fixed to the jaws (41) in order to displace the jaws (41) radially during axial displacement of the control button (42). Thus an axial movement of the control button (42) is transformed into a radial displacement movement of the jaws (41) between a closing position and an opening position. When in the closing position, the jaws (41) tightly grip the peripheral edge of the container (43) in order to hermetically seal the vessel. Conversely, the jaws (41) can occupy an unlocking position permitting opening of the vessel.

With reference to FIGS. 8 to 10, another pressure vessel of U.S. Pat. No. 5,613,424 comprises a cover (60), a container (61) and a control device (50) including two jaws (51) and a control element (52). The jaws (51) are diametrically opposite one another relative to the longitudinal axis of the vessel, and mounted on the cover (60) for radial movement displacement. The control element (52) is fixed with a triangular member (521) movable in a radial direction perpendicular to the radial direction of movement of the jaws (51). When the control element (52) is pushed or pulled manually along the radial direction, flanks of the triangular member (521) are engaged on the jaws (51) to progressively displace the jaws (51) apart or disengage with the jaws (51) to let the jaws (51) grip the peripheral edge of the container (61) tightly.

However, the above described conventional pressure vessels have the following defects;

1. the structure of the control device for the conventional pressure vessel is too complicated, which leads to high production costs;
2. as the control device for the conventional pressure vessel requires a series of pieces which are movable relative to one another, a jamming risk may be provoked, so that the reliability of operation of the controlling device is not ensured;
3. the operation of the conventional pressure vessel requires a lot of physical effort from a user, which offers less operating safety and inconvenience from the ergonomic standpoint.

Therefore, it is an objective of the invention to provide a pressure vessel to mitigate and/or obviate the aforementioned problems.

SUMMARY OF THE INVENTION

The main object of the present invention is to provide a pressure vessel with a control device for closing and opening of a cover of the pressure vessel. The control device comprises a knob pivotally mounted on the cover, at least two driving arms each fixed with one jaw at an outer end thereof and formed with an engagement post at an inner end thereof, and a rotary plate co-axially fixed at a lower end of the knob and formed with at least two rotary drivers corresponding to the engagement posts of the driving arms. Whereby when the knob is turned manually, the rotary plate is rotated with the knob, so that the engagement posts of the driving arms driven by the relative rotary drivers are progressively displaced in radial directions. In this way the driving arms are displaced between a locking position in which the cover is locked to the pressure vessel and an unlocking position in which the cover can be removed from the pressure vessel. As the structure of the control device of the invention is simple and low precision parts of the control device are required, the production costs are obviously low.

Another object of the present invention is to provide the pressure vessel with the control device for closing and opening of the cover of the pressure vessel whereby the reliability of the control device of the pressure vessel is good.

A further object of the present invention is to provide the pressure vessel with the control device for closing and opening of the cover of the pressure vessel whereby the safety and ergonomics of the operation of the pressure vessel are good.

Other objects, advantages and novel features of the invention will become more apparent from the following detailed description when taken in conjunction with the accompanying drawings.

DETAILED DESCRIPTION OF THE PREFERRED EMBODIMENT

Figure 1:
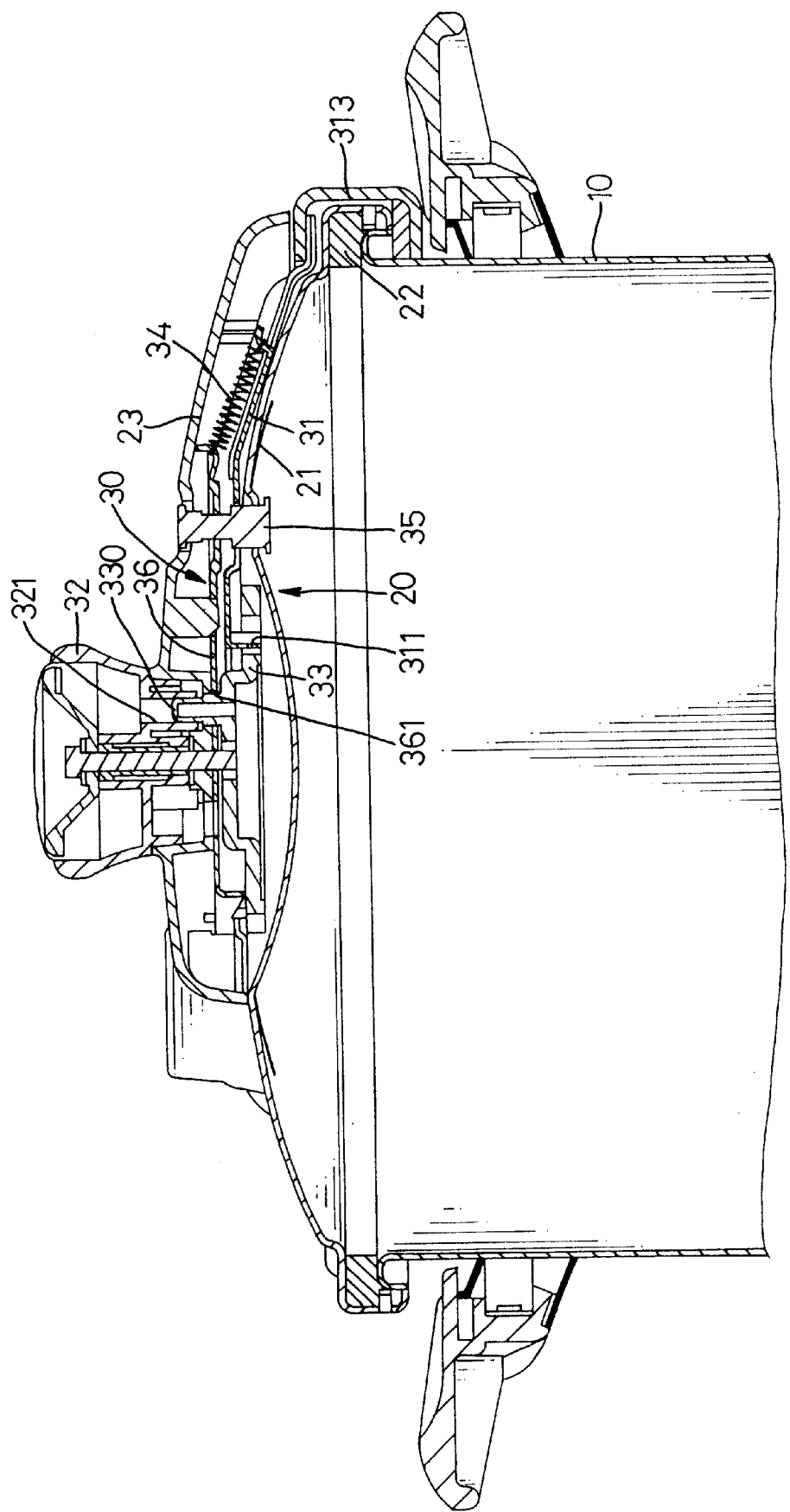
FIG. 1 is a cross sectional view of a pressure vessel in accordance with the invention.
Figure 2:
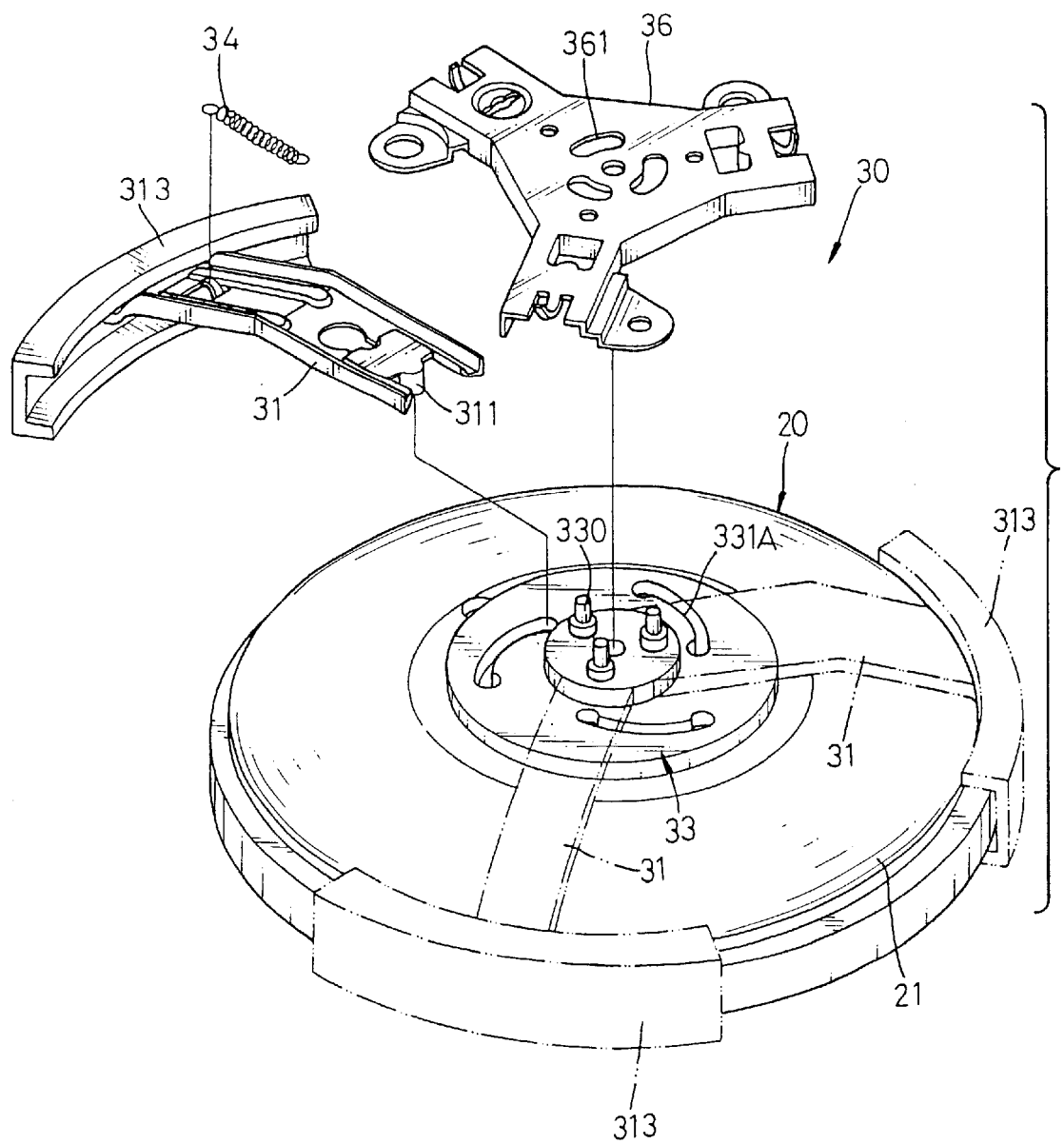
FIG. 2 is an exploded perspective view of the pressure vessel in accordance with invention.

As shown in FIGS. 1 and 2, a pressure vessel in accordance with the present invention comprises a container (10), a cover (20) and a control device (30) for closing and opening of the cover (20) of the container (10). The container (10) is preferably made from stainless steel. The cover (20) has a body (21) shaped in conformity with an opening of the container (10). A gasket ring (22) is mounted around an inner side of a peripheral edge of the body (21) to hermetically seal the opening of the container (10) when controlling device (30) tightly grips the peripheral edge of the body (21) of the cover (20) in a closing position.

The control device (30) comprises at least two driving arms (31) movable in a radial direction relative to a central axis of the cover (20), a knob (32) pivotally mounted at the central axis of the cover (20), a rotary plate (33) co-axially fixed at a lower end of the knob (32) and being rotatable together with the knob (32), and a fixed frame (36) mounted on the body (21) above the rotary plate (33) and the driving arms (31). As a preferred embodiment shown in the attached drawings, the control device (30) comprises at least three driving arms (31).

Each driving arm (31) has an inner end thereof integrally formed with an engagement post (311) and an outer end thereof securely connected with a jaw (313), which has a C-shaped cross section in conformity with the peripheral edge of the cover 20.

The knob (32) is defined with multiple assembly holes (321) in the lower end thereof corresponding to multiple assembly pins (330) fixed on the rotary plate (33). The assembly pins (330) extend through multiple arc slots (361) defined in the fixed frame (36) and then engage into the corresponding assembly holes (321) of the knob (32). Therefore, when the knob (32) assembled with the rotary plate (33) is rotated manually, the rotary plate (33) is rotated together with the knob (32).

The rotary plate (33) is particularly formed with multiple rotary drivers (331) corresponding to the multiple driving arms (31). In one practicable embodiment as shown in FIGS. 1 to 5, the rotary drivers (331) are multiple equal-spaced arcuate slots (331A) defined in the rotary plate (33). The engagement posts (311) of the driving arms (31) are respectively fitted in the arcuate slots (331A) and progressively movable in a radial direction to the central axis of the cover (20) along the arcuate slots (331A) between a locking position, in which the engagement posts (311) are nearest to the central axis of the cover (20) and the cover (20) is locked to the container (10), and an unlocking position, in which the engagement posts (311) are furthest from the central axis of the cover (20) and the cover (20) can be removed from the container (10).

An elastic element (34) is provided between each driving arm (31) and the fixed frame (36) to assure retraction of the driving arm (31). An outer hood (23) of the cover (20) is provided on the body (21) and above the driving arms (31). At least one safety button (35) is provided on the cover (20) and particularly extends through the body (21), the driving arm (31) and the outer hood (23) of the cover (20). When the air pressure of the pressure vessel is raised high enough in heating, the safety button (35) is lifted upward by the air pressure, therefore a user can not turn the knob (32) before depressurizing of the pressure vessel.

Figure 6:
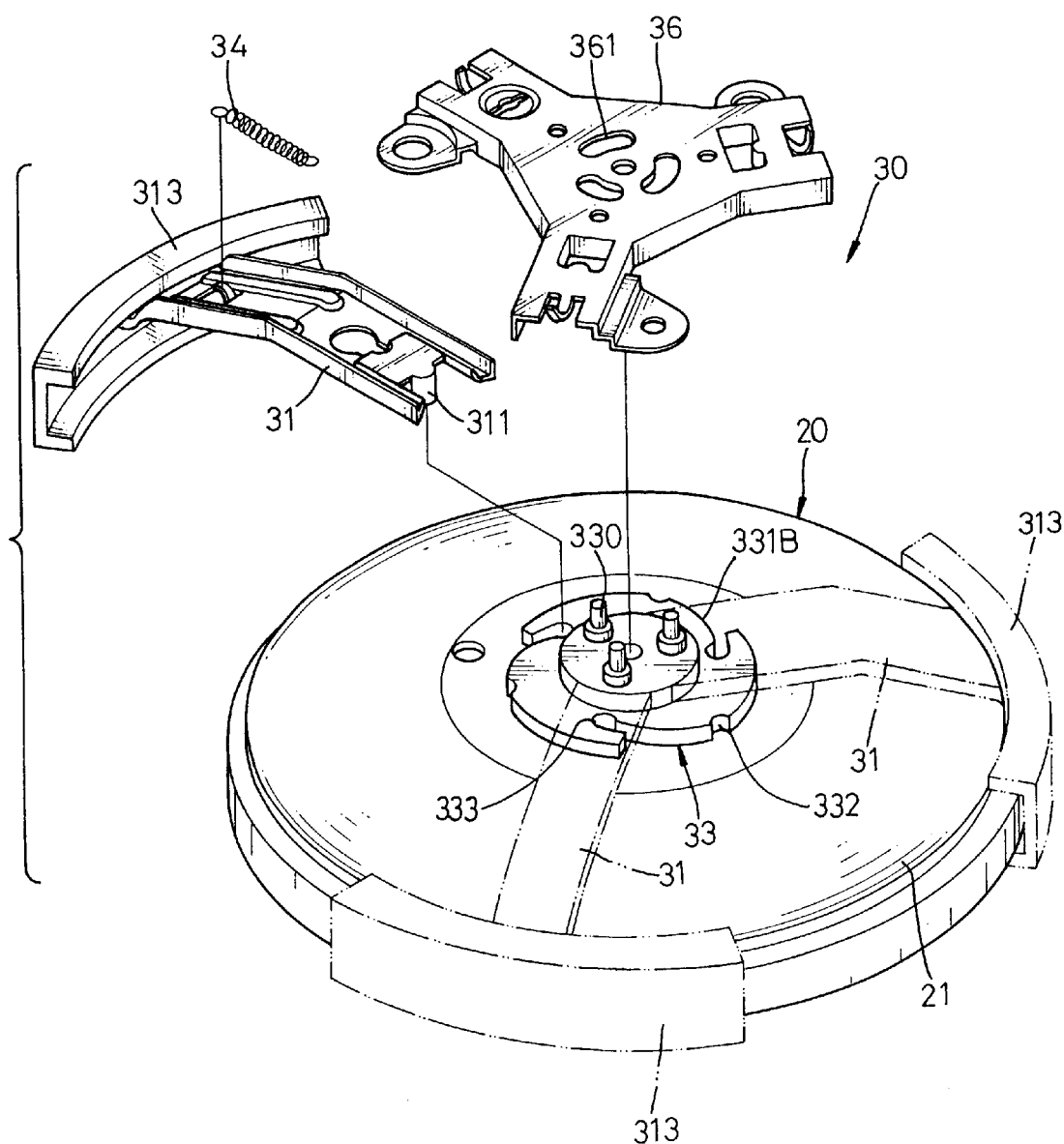
FIG. 6 is an exploded perspective view of another embodiment of the pressure vessel in accordance with the invention.
Figure 7:
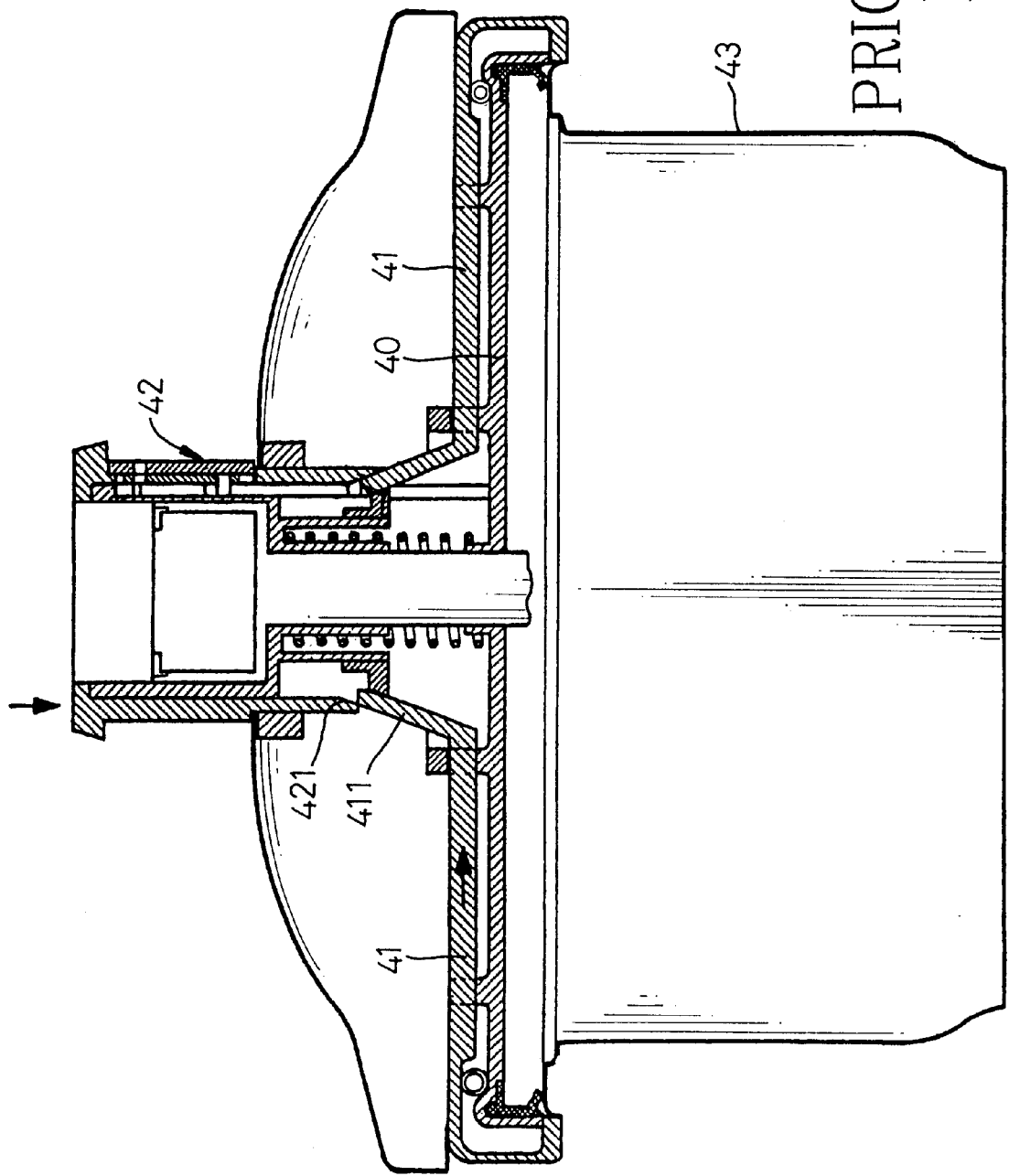
FIG. 7 is a side cross sectional view of a first conventional pressure vessel.
Figure 8:
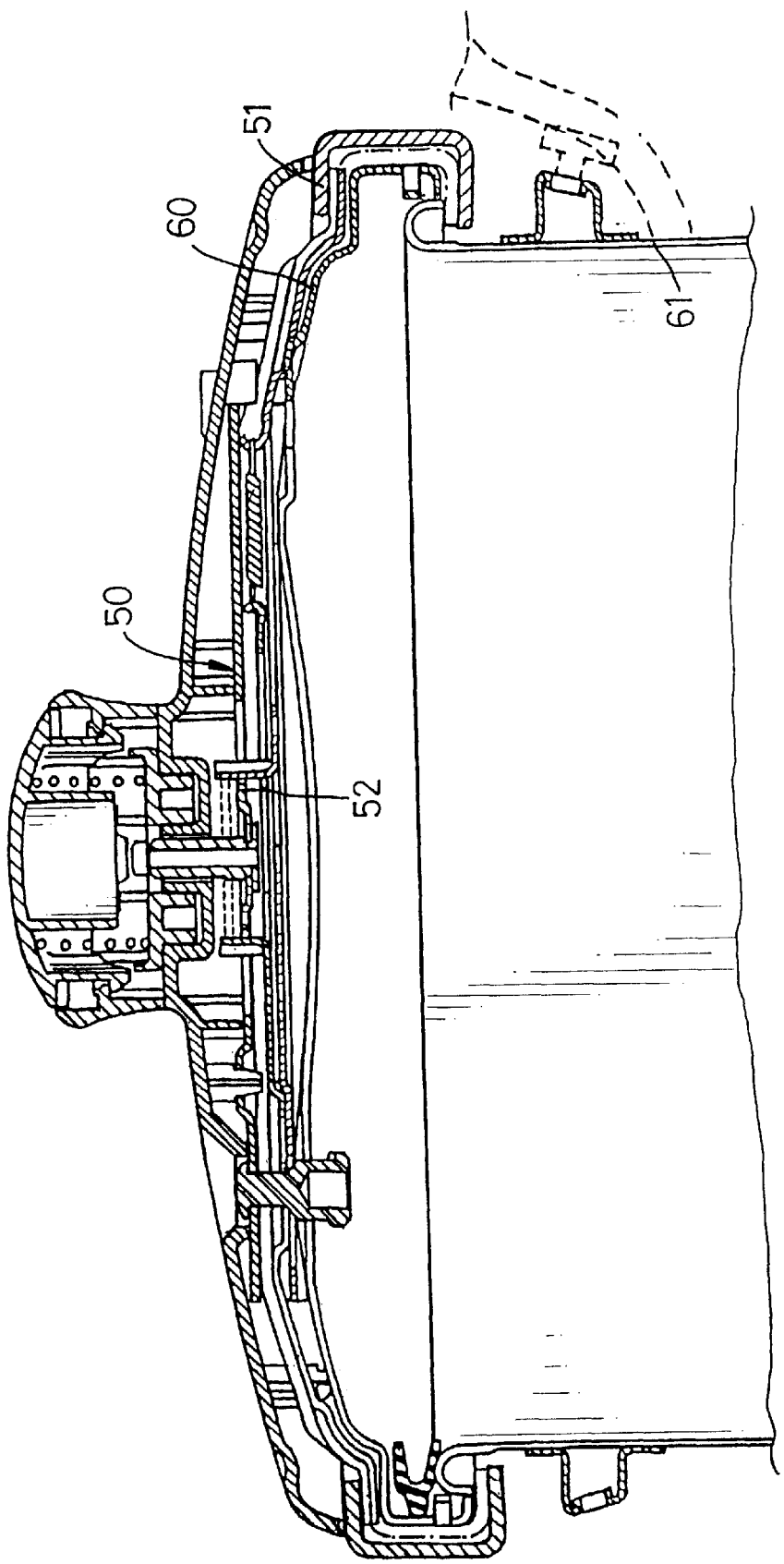
FIG. 8 is a side cross sectional view of a second conventional pressure vessel.
Figure 9:
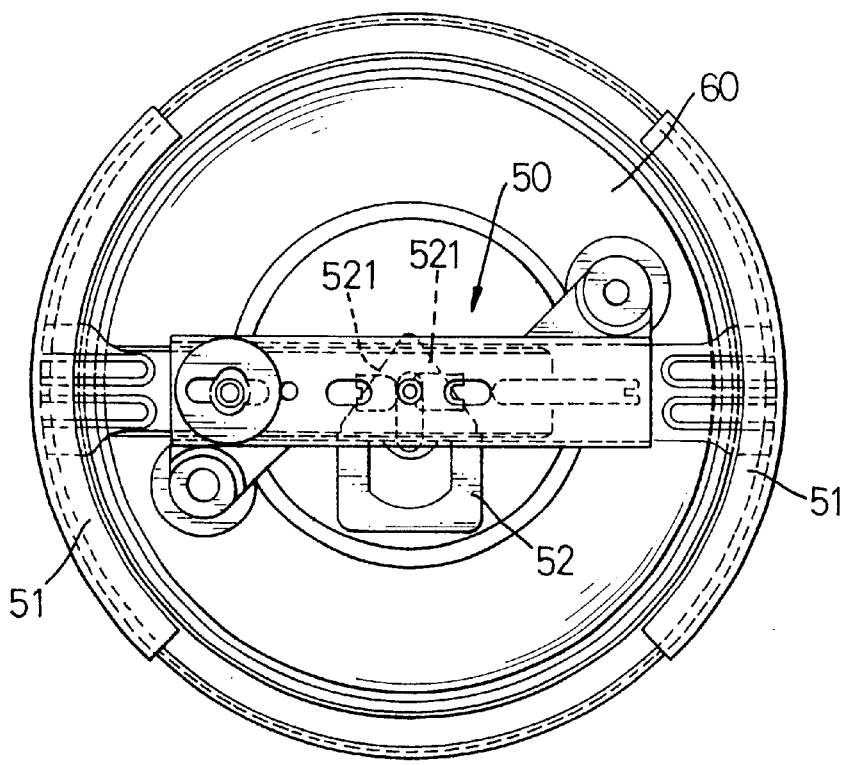
FIG. 9 is a schematic plan view of the second conventional pressure vessel in a locking status.
Figure 10:
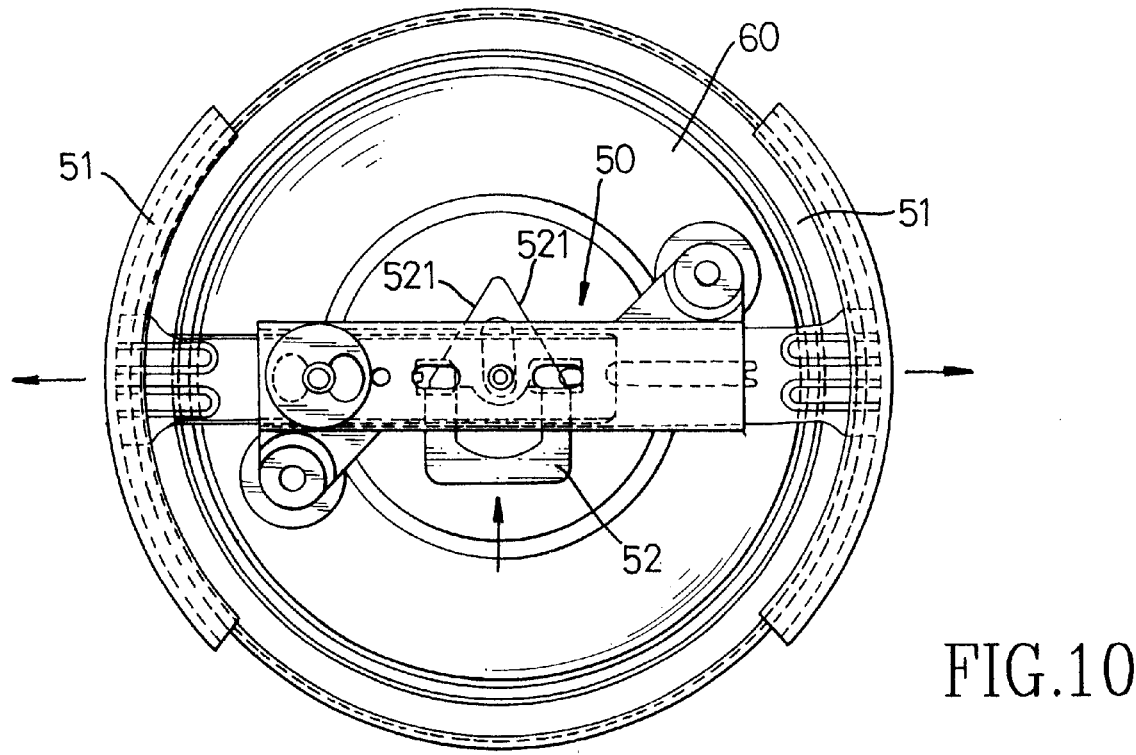
FIG. 10 is a schematic plan view of the second conventional pressure vessel in an unlocking status.

Another practicable embodiment of the rotary drivers (331) of the rotary plate (33) as shown in FIG. 6 is formed with multiple equal-spaced cam engagement surfaces (331B) around the peripheral edge thereof. The engagement posts (311) of the driving arms (31) are respectively pressed against the cam engagement surfaces (331B) of the rotary plate (33) and progressively movable in a radial direction to the central axis of the cover (20) between a locking position, in which the engagement posts (311) are nearest to the central axis of the cover (20) and the cover (20) is locked to the container (10) and an unlocking position, in which the engagement posts (311) are furthest from the central axis of the cover (20) and the cover (20) can be removed from the container (10). Each cam engagement surface (331B) has a spring hole (333) defined therein to position the relative engagement post (311) in the locking position, and a positioning hole (332) defined therein to position the relative engagement post (311) in the unlocking position.

Figure 3:
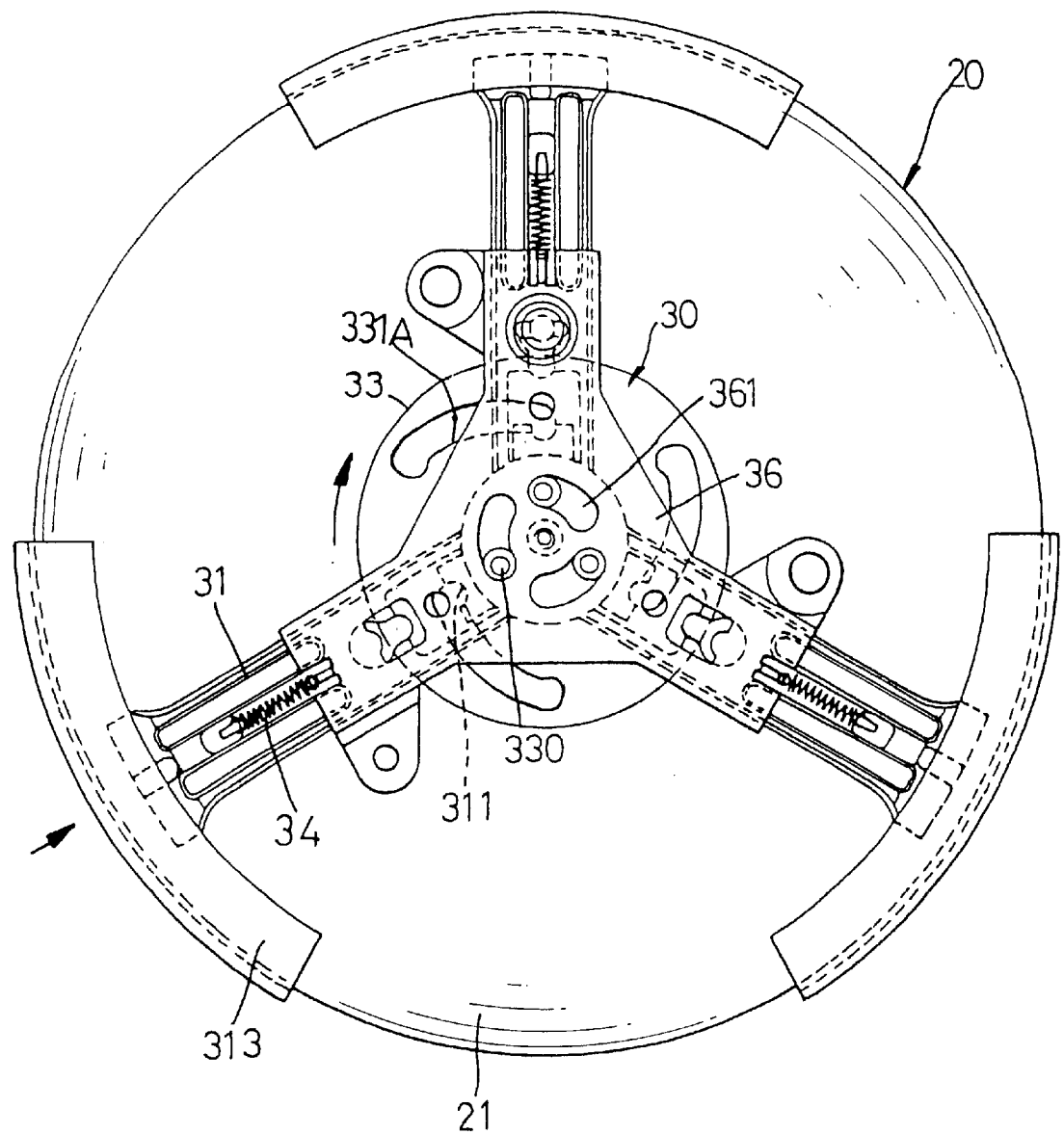
FIG. 3 is a schematic plan view of the pressure vessel in accordance with the invention, showing the pressure vessel in a locking status.

With reference to FIGS. 1 and 3, when the knob (32) is turned in a closing direction, as the driving arms (31) are respectively driven by the elastic members (34), the engagement posts (311) of the driving arms (31) are respectively positioned by the rotary drivers (331) to the position nearest to the central axis of the cover (20), and the driving arms (31) are progressively moved radially towards the central axis of the cover (20) to hermetically lock the cover (20) on the container (10).

Figure 4:
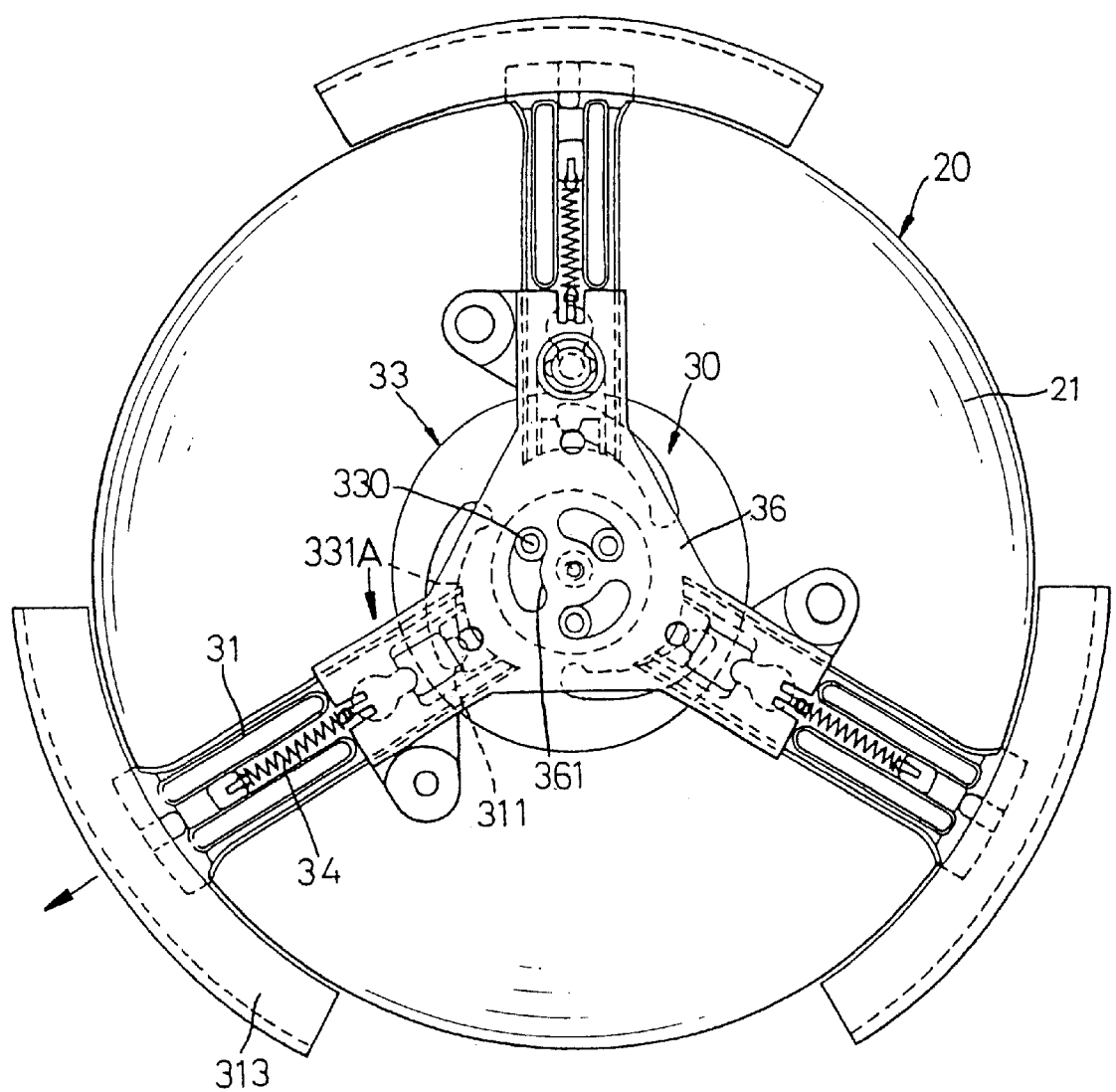
FIG. 4 is a schematic plan view of the pressure vessel in accordance with the invention, showing the pressure vessel in an unlocking status.
Figure 5:
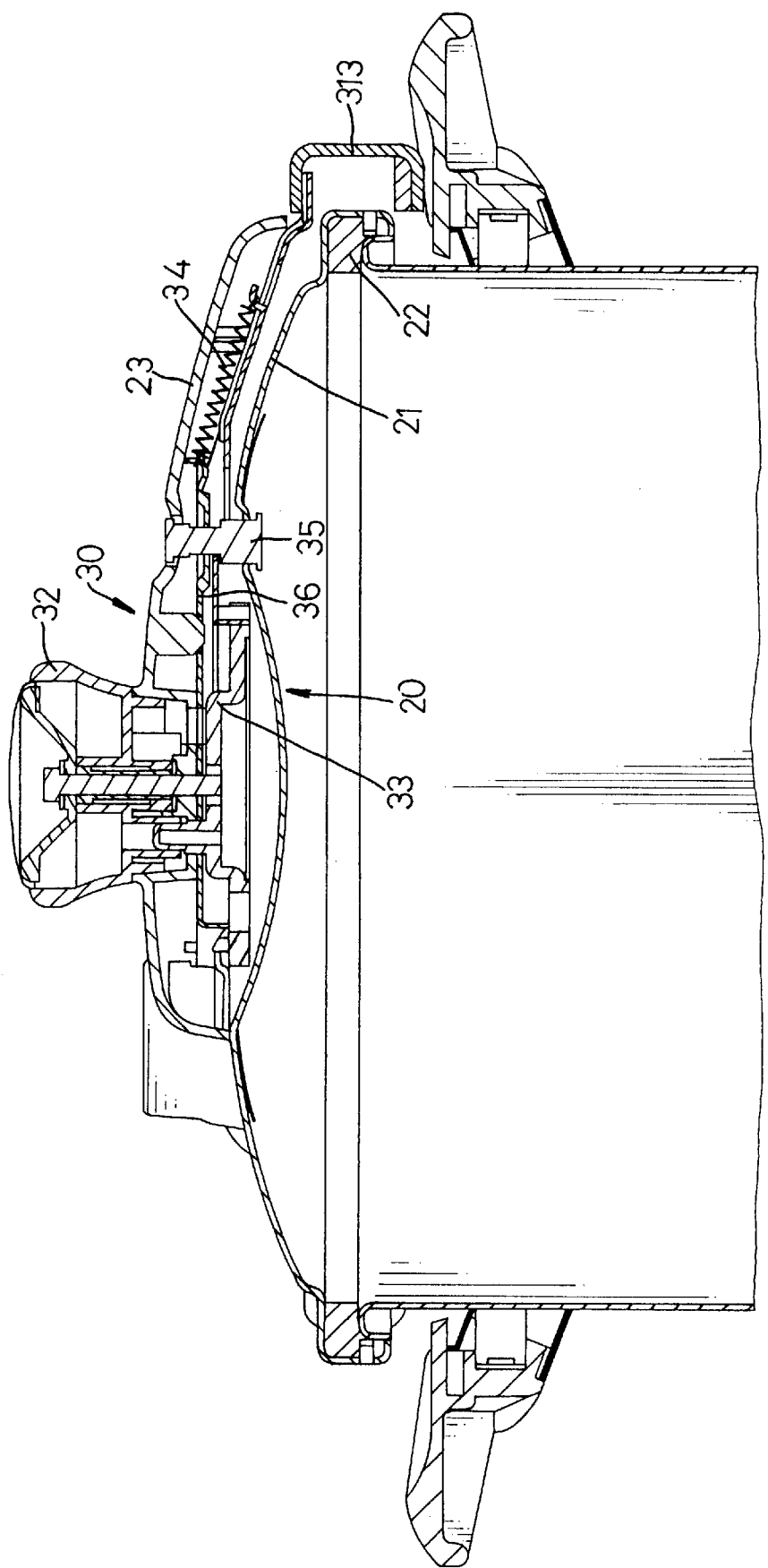
FIG. 5 is a side cross sectional view of the pressure vessel in accordance with the invention in the unlocking status.

With reference to FIGS. 4 and 5, after the pressure vessel is depressurized, the safety button (35) drops and then the knob (32) can be turned in an opening direction that is counter to the closing direction, the engagement posts (311) of the driving arms (31) are respectively driven by the rotary drivers (331) to the position furthest from the central axis of the cover (20), and the driving arms (31) progressively move radially outwards to unlock the cover (20) from the container (10). Thus the cover (20) can be removed from the container (10) in a safe and ergonomic way.

The advantages of the present invention follow hereinafter:

1. the structure of the pressure vessel is simple, and the precision of parts and assembly of the pressure vessel is broad, so that the production cost of the pressure vessel of the invention is low;
2. the operation of the control device (30) of the pressure vessel is convenient, ergonomic and safe;
3. as the assembly precision of the pressure vessel is broad, the operation of the controlling device of the pressure vessel is reliable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pressure vessel comprising a container (10), a cover (20) and a control device (30) for closing and opening the cover (20) of the container (10), wherein the control device (30) having:

at least two driving arms (31) movably mounted on a body (21) of the cover (20), each driving arm (31) having an inner end formed with an engagement post (311) and an outer end securely connected to a jaw (313);

a knob (32), which is pivotally mounted on a central axis of the cover (20) and defined with multiple assembly holes (321) in the lower end thereof, the assembly holes (321) corresponding to multiple assembly pins (330) fixed on the rotary plate (33);

a rotary plate (33) co-axially fixed at a lower end of the knob (32) and rotatably moveable together with the knob (32), and formed with at least two rotary drivers (331) corresponding to the engagement posts (311);

a fixed frame (36) mounted on the body (21) of the cover (20) above the driving arms (31) and the rotary plate (33), and defined with multiple arc slots (361) corresponding to the assembly pins (330); and multiple elastic elements (34) respectively provided between driving arms (31) and fixed frame (36) to assure retraction of the driving arms (31);

whereby the jaws (313) fixed with the driving arms (31) driven by the rotary drivers (331) of the rotary plate (33) are movable in a radial direction relative to the central axis of the cover (20) by turning the knob (32) manually between a locking position in which the cover (20) is locked to the container (10) and an unlocking position in which the cover (20) can be removed from the container (10).

2. The pressure vessel as claimed in claim 1, wherein an outer hood (23) is provided on the body (21) of the cover (20) and above the driving arms (31).

3. The pressure vessel as claimed in claim 1, wherein at least one safety button (35) is provided on the cover (20).

4. The pressure vessel as claimed in claim 1, wherein the rotary drivers (331) are multiple equal-spaced arcuate slots (331A) defined in the rotary plate (33), the engagegement posts (311) of the driving arms (31) are respectively fitted in the arcuate slots (331A) and progressively movable in a radial direction to the central axis of the cover (20) along the arcuate slots (331) between a locking position, in which the engagement posts (311) are nearest to the central axis of the cover (20) and the cover (20) is locked to the container (10), and an unlocking position, in which the engagement posts (311) are furthest from the central axis of the cover (10) and the cover can be removed from the container.

5. The pressure vessel as claimed in claim 1, wherein the rotary drivers (331) are multiple equal-spaced cam engagement surfaces (331B) formed around the peripheral edge of the rotary plate (33), the engagement posts (311) of the driving arms (31) are respectively pressed against the cam engagement surfaces (331B) of the rotary plate (33) and progressively movable in a radial direction to the central axis of the cover (20) between a locking position, in which the engagement posts (311) are nearest to the central axis of the cover (20) and the cover (20) is locked to the container (10), and an unlocking position, in which the engagement posts (311) are furthest from the central axis of the cover (20) and the cover (20) can be removed from the container (10).

6. The pressure vessel as claimed in claim 5, wherein each cam engagement surface (331B) has a spring hole (333) defined therein to position the relative engagement post (311) in the locking position, and a positioning hole (332) defined therein to position the relative engagement post (311) in the unlocking position.

* * * * *